July 14, 1970                  R. A. RAVENEL                3,520,286
                            VALVE GEAR DISPOSAL
Filed July 15, 1968                                      2 Sheets-Sheet 2
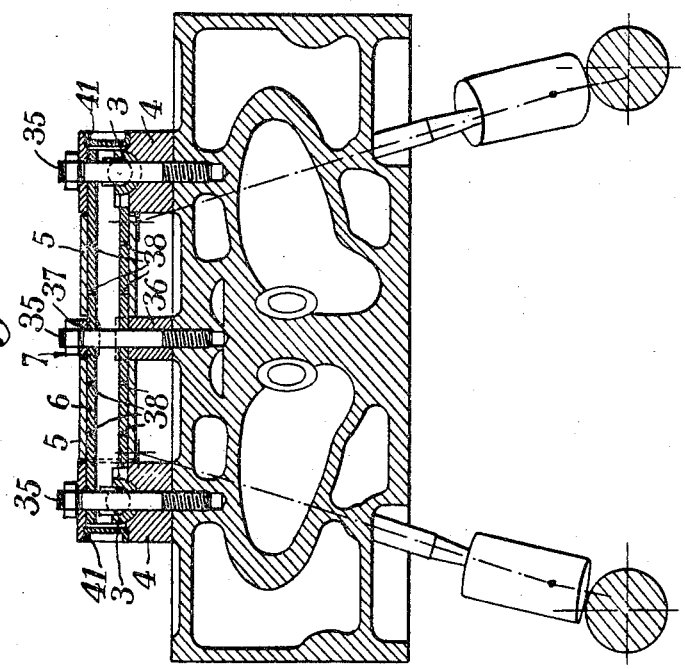
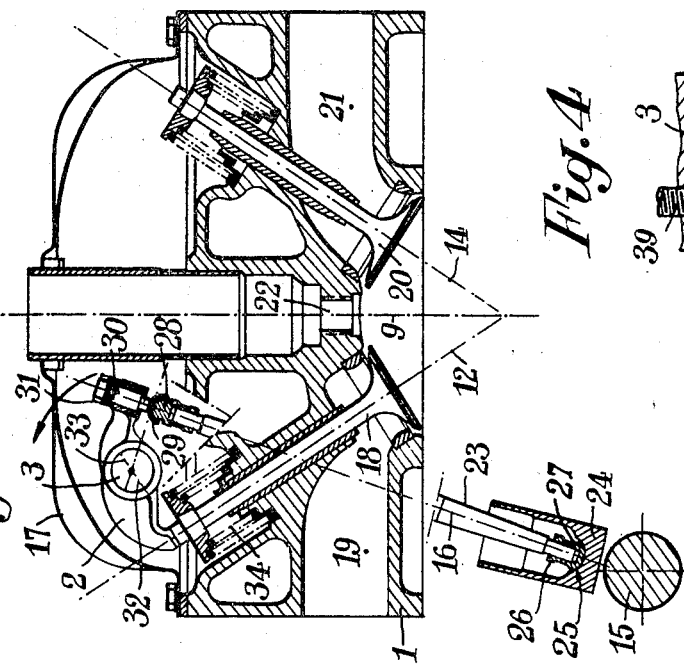
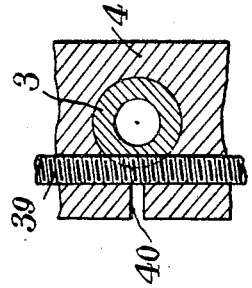

United States Patent Office 3,520,286
Patented July 14, 1970

3,520,286
VALVE GEAR DISPOSAL
Raymond A. Ravenel, Sceaux, France, assignor to Societe Anonyme Andre Citroen, Paris, France, a French company
Filed July 15, 1968, Ser. No. 744,716
Claims priority, application France, July 20, 1967, 115,009
Int. Cl. F02b 75/20; F01l 1/18
U.S. Cl. 123—59        10 Claims

ABSTRACT OF THE DISCLOSURE

This valve gear disposal is designed for an internal combustion engine having in-line cylinders and a cylinder head formed with hemispherical or dome-shaped combustion chambers each equipped with four valves and comprising twin camshafts each adapted to operate the valves disposed on a same side of the longitudinal center line of the cylinder head by means of one push-rod and one rocker per valve. This valve gear comprises two sets of rockers operated by lateral camshafts, the first set of rockers being pivotally mounted on two longitudinal rocker shafts having their axes parallel to, and disposed on either side of, the longitudinal plane containing the cylinder axes, the other set of rockers being pivotally mounted on oblique transverse rocker shafts overlying, and disposed between each pair of adjacent cylinders, said transverse rocker shafts intersecting at least one of said longitudinal rocker shafts.

BACKGROUND OF THE INVENTION

The present invention relates generally to valve gear disposals of internal combustion engines and has specific reference to a disposal of this character for an engine comprising in-line cylinders and a cylinder head having hemispherical or dome-shaped combustion chambers, with four valves and a central spark plug per cylinder.

Engines of this type are already known wherein the four valves of a same cylinder are operated by twin overhead camshafts, two opposite valves having the same exhaust or induction function. The valves are operated by means of two rockers per valve, one rocker engaging the camshaft and the other the valve.

However, this valve gear is objectionable in that it requires two different types of rockers for a same valve, thus making the gear more complicated and increasing the vertical dimensions of the cylinder head.

It is the essential object of this invention to provide a simple and economical valve gear arrangement for an internal combustion engine having in-line cylinders, a cylinder head provided with hemispherical or dome-shaped combustion chambers and comprising four overhead valves per cylinder.

It is another object of this invention to provide a valve gear arrangement of relatively reduced over-all dimensions permitting the design of cylinder heads of relatively moderate vertical dimension.

It is a further object of this invention to facilitate the lubrication of a valve gear disposal of the type broadly set forth hereinabove.

SUMMARY OF THE INVENTION

The valve gear disposal according to this invention, designed for an internal combustion engine having in-line cylinders and a cylinder head formed with hemispherical or dome-shaped combustion chambers each equipped with four valves and comprising twin camshafts each adapted to operate the valves disposed on a same side of the longitudinal center line of the cylinder head by means of one push-rod and one rocker per valve, is characterized in that it comprises two sets of rockers operated by lateral camshafts, the first set of rockers being pivotally mounted on two longitudinal rocker shafts having their axes parallel to, and disposed on either side of, the longitudinal plane containing the cylinder axes, the other set of rockers being pivotally mounted on oblique transverse shafts overlying, and disposed between each pair of adjacent cylinders, said transverse rocker shafts intersecting at least one of said longitudinal rocker shafts.

According to a preferred form of embodiment of this invention, the valve gear disposal for an internal combustion engine of the above-defined type, is further characterized in that the longitudinal rocker shafts and the oblique transverse rocker shafts about which the rockers are pivotally mounted are made of tubes, and in that the ducts thus formed within the rocker shafts communicate with each other.

According to a preferred form of embodiment of this invention, the valve gear disposal for an internal combustion engine of the above-defined type is further characterized in that the lateral camshafts have each a specific function, in that each camshaft operates only valves having the same functions, that is, either induction or exhaust.

This preferred form of embodiment incorporating the three features set forth hereinabove permits of avoiding the above-mentioned drawbacks while using four overhead valves and two lateral camshafts.

Due notably to the fact that the rocker shafts are hollow or tubular and communicate with each other, transverse holes may advantageously be formed therethrough at the level of the rocker bores, and all the ends of these tubular supports can be sealed, except one which may be provided with a lubricant injection union for connection to lubricating means constituting the only point where lubricant under pressure is supplied for lubricating all the rockers on their rocker shafts.

As in a known engine mentioned hereinabove, wherein the camshafts operate both indifferently inlet valves and exhaust valves, this possibility may be contemplated without any difficulty in a further form of embodiment of this invention comprising only the above-mentioned possibility and/or second features. This possibility permits of disposing valves of either type on either side of the longitudinal center line. However, with the preferred form of embodiment comprising the third feature, each camshaft has a specific function, thus affording a separate timing of both shafts and the possibility of varying this timing as a function of the engine rating.

BRIEF DESCRIPTION OF THE DRAWING

Now reference will be made to the accompanying drawing illustrating diagrammatically a preferred form of embodiment of this invention, given by way of example, it being understood that various modifications may be brought thereto without departing from the spirit and scope of the invention as set forth in the appended claims. In the drawings:

FIG. 2 is a cross section taken along the line 2—2 of FIG. 1 and containing the cylinder axis;

FIG. 3 is an oblique transverse section taken along the line 3—3 of FIG. 1 and containing the axis of an oblique transverse rocker shaft;

FIG. 4 is a fragmentary cross-sectional view showing a detail.

DESCRIPTION OF THE PREFERRED EMBODIMENT

Figure 1:
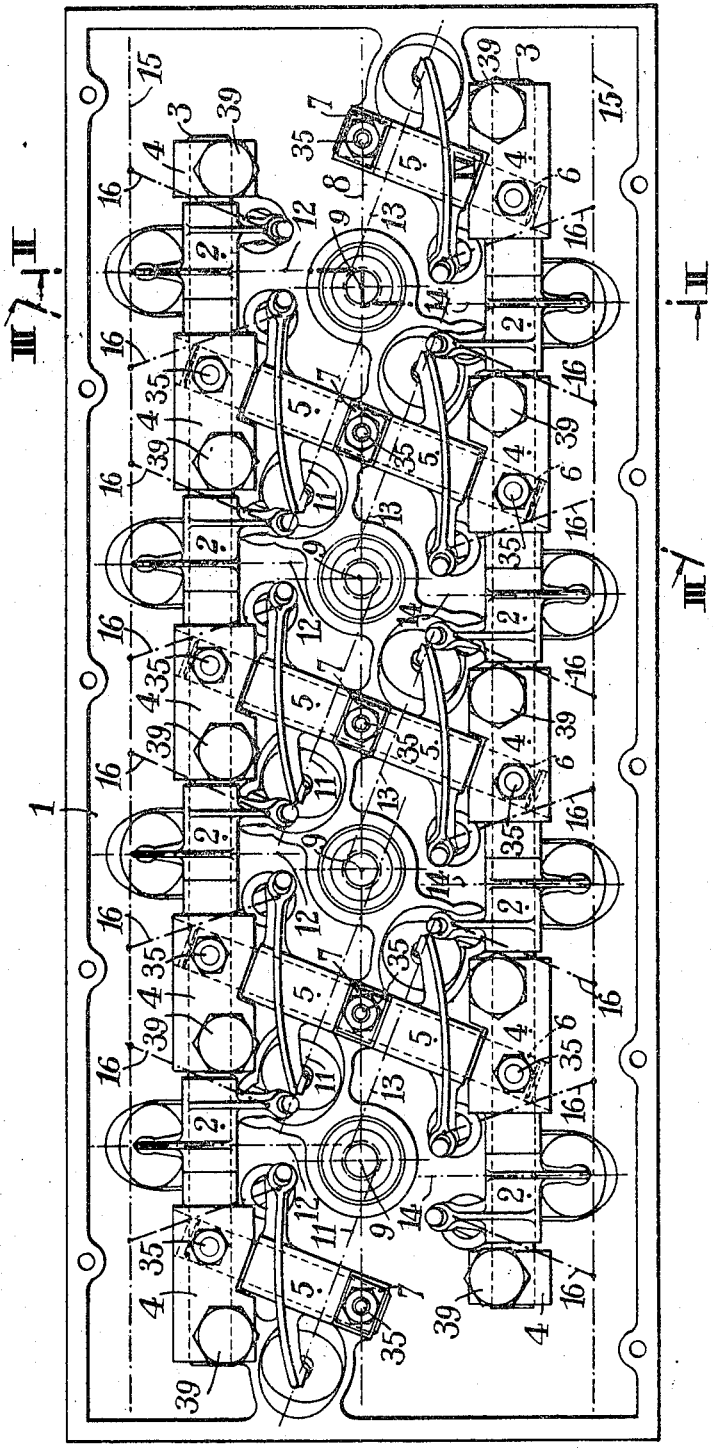
FIG. 1 is a plan view from above of the cylinder head with its valve gear, the valve gear cover being removed therefrom.

The valve gear disposal illustrated in FIG. 1 comprises essentially a cylinder head 1 on which a first set of rockers 2 are mounted; these rockers 2 are adapted to pivot on two longitudinal shafts 3 secured to the cylinder head 1 by brackets 4; a second set of rockers 5 are adapted to pivot on oblique transverse shafts 6 having their ends secured by means of the same brackets 4 to the cylinder head 1, the central portion of these oblique rocker shafts 6 being locked in position by clamping means 7.

The rockers 2 and 5 disposed on the same side with respect to the longitudinal center line 8 coincident with the plane containing the cylinder axes 9 are adapted, according to a preferred form of embodiment of the invention, to operate two adjacent valves shown diagrammatically in FIG. 1 by their axes 11 and 12 on one side of said center line 8 and by their axes 13 and 14 on the opposite side of this line, the valves 11, 12 or 13, 14 disposed on a same side with respect to said line 8 having a same inlet- or exhaust-controlling function, respectively.

The rockers disposed on the same side of the longitudinal center line 8 are operated in turn by one of a pair of lateral camshafts 15 by means of push-rods 16, only the axes of these camshafts and push-rods being shown in FIG. 1.

The axes 11, 13 and 12, 14 of the valves registering by pairs are each disposed in a plane parallel to the cylinder axes 9 and the planes containing the axes of two registering valves are symmetrical by pairs in relation to said axis 9.

Whereas the valve axes 12 and 14 lie in transverse planes at right angles to the axes of rocker shafts 3 about which the rockers 2 associated with the corresponding valves are pivotally mounted, the other axes 11 and 13 lie in oblique planes disposed at right angles to the axes of rocker shafts 6 about which the rockers 5 associated with the valves are pivoted, said oblique planes forming with the plane containing the cylinder axes 9 and the longitudinal center line 8 of the engine an angle of which the value, given by way of example only, is about 20°.

The operation of this valve gear is more readily apparent from the section of FIG. 2 showing essentially the cylinder head 1 and its cover 17, an exhaust valve 18 and its exhaust port 19, an inlet valve 20 and its inlet port 21, the spark plug cavity 22, and also a rocker of the type denoted by the reference numeral 2 in FIG. 1.

The operation of the valve gear will now be described with specific reference to a rocker of the aforesaid type 2, but it is clear that this operation is exactly the same in the case of a rocker of type 5.

The axis 16 of the push-rod 23 associated with this rocker is perpendicular neither to the camshaft axis nor to the pivot axis of the rocker, this push-rod incorporating conventional means for transmitting the motion from the camshaft to the rocker.

At the lower end of the push-rod 23 these means consist in this example of a tapped 24 co-acting with a cam (not shown) of camshaft 15, this tappet being formed with a part-spherical recess 25 engaged by the lower end of push-rod 23 provided to this end with an end piece 26 formed with a ball-shaped end 27.

At its upper end the push-rod 23 comprises another end piece 28 formed with a ball-shaped end engaging a part-spherical recess 29 rigid with the end of an adjustment screw 30 to permit relative swivelling movements between the push-rod and the rocker.

This screw 30 has a lock nut 31 co-acting in a manner known per se with a first arm of the companion rocker 2 for adjusting this rocker and therefore the valve 18.

The opposite arm of rocker 2 engages the outer end of the valve stem and is formed to this end with a slightly bulged surface although this bulged surface is not apparent in FIG. 2.

The push-rod 23 transmits its movement to the rocker 2 by causing the latter to pivot in the direction of the arrow and in the plane of FIG. 2 about the rocker shaft 3, this rocker 2 transmitting in turn its movement to the valve 18 against the resistance of known resilient return means 34, by pushing this valve in the plane of FIG. 2 in the direction of its axis 12 towards the interior of the cylinder.

According to this invention, the valve gear may comprise only one feed inlet for the forced lubrication of the complete series of rockers 2 and 5 along their shafts 3 and 6. To this end and as illustrated in FIGS. 3 and 4, these shafts 3 and 6 are hollow and the ducts formed therein communicate with one another within blocks or brackets 4 acting both as means for securing the rocker shafts to the cylinder head 1 by means of studs 35 and as a means for sealing this assembly at the crossing points of shafts 3 and 6 where these shafts are notched to constitute communicating chambers permitting the passage of lubricating oil from one shaft 3 to another shaft 6, the studs 35 permitting the passage without causing any oil leakage.

Furthermore, the rocker shafts 6 are secured to the cylinder head 1 intermediate their ends or at one of their ends in the case of the endmost rocker shafts 6, by means 7 consisting of a support 36, a fastening cap 37 and a stud 35 extending through said cap, rocker shaft and support, and stud being screwed in the cylinder head 1. A nut engages this stud 35 for the dual purpose of clamping the cap and support in a fluid-tight manner about the rocker shaft 6 and fastening the assembly to the cylinder head.

At least one radial hole 38 for the lubricant is formed in the rocker shafts 3 and 6 at the level of each rocker 2 or 5, as illustrated in FIG. 3 showing only the cylindrical bodies of rockers 5.

FIG. 4 illustrating in section a rocker shaft 3 at the level of a bracket 4 further shows the manner in which the studs 39 securing the cylinder head to the cylinder block (not shown) of the engine are also used for locking, by clamping action, the rocker shafts 3 in these brackets 4, a slot 40 being formed along one fraction of the length of a lateral face of each bracket for this purpose. The passage for the studs 39 is provided by slightly notching the rocker shafts 3 along one portion only of the annular thickness of these rocker shafts.

The ends of each rocker shaft 6 as well as those of rocker shafts 3 can be sealed by means of plugs 41 (see FIG. 3) or any other suitable device, the lubricant being fed to the rockers preferably through a single injection union (not shown) fitted at any desired point along the rocker shafts 3 or 6 or at one end thereof, for example as a substitute for a plug 41.

Of course, various modifications and variations may be brought to the preferred form of embodiment described hereinabove with reference to the drawing without departing from the basic principle of the invention as set forth in the appended claims.

What I claim is:

1. A valve gear disposal for an internal combustion engine having in-line cylinders and a cylinder head provided with hemispherical combustion chambers each equipped with four valves, and comprising two camshafts each adapted to operate the valves disposed on one side of the longitudinal center line of the engine by means of one-push-rod and one rocker per valve, wherein two sets of rockers operated by lateral camshafts are provided, the first set of rockers being pivotally mounted on two longitudinal rocker shafts having their axes parallel to the longitudinal plane containing the axes of the cylinders, and disposed on either side of said plane, the second set of rockers being pivotally mounted on oblique transverse rocker shafts extending above and between each pair of adjacent cylinders, said transverse rocker shafts intersecting at least one of said longitudinal rocker shafts.

2. A valve gear disposal as set forth in claim 1, wherein said pair of lateral camshafts are each operatively connected to rockers actuating valves having the same function, that is, inlet for the valves associated to one camshaft and exhaust for the valves associated to the other camshaft, whereby the timing of each camshaft can be adjusted separately as a function of the engine rating.

3. A valve gear disposal as set forth in claim 1, wherein said oblique transverse rocker shafts and said longitudinal rocker shafts on which said rockers are pivotally mounted consist of tubular members, the ducts thus formed in said rocker shafts communicating with one another and constituting a lubrication circuit.

4. A valve gear disposal as set forth in claim 3, wherein only one feed inlet is provided for feeding lubricant to all the rockers mounted on said rocker shafts.

5. A valve gear disposal as set forth in claim 4, wherein at least one transverse hole is provided in the rocker shafts at the level of each rocker, whereby the lubricant may flow towards the external surface of the rocker shafts and inside the bore of the rockers for lubricating action.

6. A valve gear disposal as set forth in claim 4, wherein brackets for securing the rocker shafts to the cylinder head are provided at the points of intersection of said rocker shafts and also at the ends thereof.

7. A valve gear disposal as set forth in claim 6, wherein said fastening brackets are adapted to seal said lubrication circuit against lubricant leakage at the level of the intersections of said rocker shafts.

8. A valve gear disposal as set forth in claim 7, wherein all the ends of said hollow rocker shafts are sealed, except one of them used for lubricant feed purpose.

9. A valve gear disposal at set forth in claim 8, wherein the non-sealed rocker shaft end constituting the lubricant feed inlet comprises a connecting union for connection to lubricating means.

10. A valve gear disposal as set forth in claim 7, wherein all the ends of said hollow rocker shafts are sealed in a fluid-tight manner and said lubricant feed inlet for supplying lubricant thereto is located at any desired and suitable point along said rocker shafts.

References Cited

UNITED STATES PATENTS

| 3,224,423 | 12/1965 | Ostborg. |
| 3,299,871 | 1/1967 | Apfelbeck. |
| 3,418,984 | 12/1968 | Skatsche. |

FOREIGN PATENTS

| 503,111 | 5/1951 | Belgium. |
| 353,756 | 10/1937 | Italy. |

AL LAWRENCE SMITH, Primary Examiner

U.S. Cl. X.R.
123—90, 191